Figure 1:
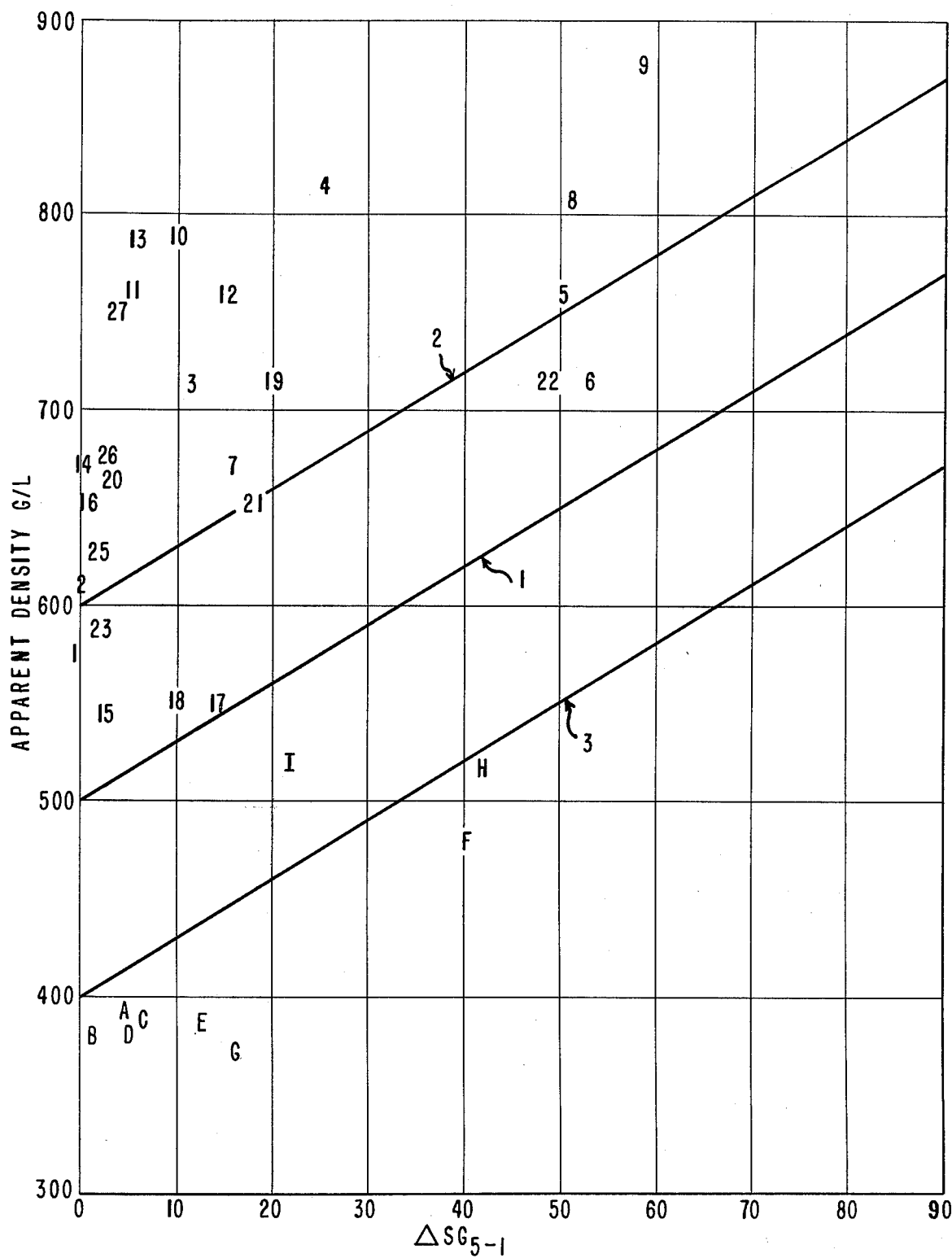

United States Patent [19]
Manwiller et al.

[11] 3,981,852
[45] Sept. 21, 1976

[54] POLYTETRAFLUOROETHYLENE MOLDING POWDER

[75] Inventors: Carl Harding Manwiller, Wilmington, Del.; Carleton Angelo Sperati, Parkersburg, W. Va.

[73] Assignee: E. I. Du Pont de Nemours and Company, Wilmington, Del.

[22] Filed: June 17, 1974

[21] Appl. No.: 480,142

[52] U.S. Cl.................................. 526/250; 526/254
[51] Int. Cl.².................. C08F 114/26; C08F 214/26
[58] Field of Search............................... 260/92.1 S

[56] References Cited
UNITED STATES PATENTS

| | | | |
|---|---|---|---|
| 2,573,639 | 10/1951 | Coler | 260/92.1 S |
| 3,087,921 | 4/1963 | Matthews et al. | 260/92.1 S |
| 3,674,762 | 4/1972 | Izumo et al. | 260/92.1 S |
| 3,690,569 | 9/1972 | Leverett | 260/92.1 S |

FOREIGN PATENTS OR APPLICATIONS 17,460   5/1973   Japan

*Primary Examiner*—Harry Wong, Jr.

[57] ABSTRACT

Finely divided polytetrafluoroethylene molding powder is disclosed having a remarkable combination of high apparent density and high moldability, the latter being reflected as a small difference in specific gravity ($\Delta SG$) of standard moldings molded at high and low preform pressures. For example, molding powders having an average particle diameter ($d_{50}$) of no greater than 60, a $\Delta SG_{5-1}$ of no greater than 30 and apparent density of at least 600 g/l are disclosed. These molding powders are obtained from unique process steps involving either the fine powder type of polytetrafluoroethylene or the granular type of polytetrafluoroethylene as the starting material. The fine powder type is compacted to a high degree, followed by partially decompacting the resultant compacted fine powder to the molding powder particle size desired. When the granular type is the starting material, this is comminuted to the molding powder particle size desired, followed by separating the molding powder into hard and soft material fractions, followed by re-grinding the relatively coarse, hard fraction by itself to an average particle size of at least as small as the original combined fractions. The resultant molding powder is useful in the manner of previous polytetrafluoroethylene molding powders with the advantage of requiring reduced mold height and molding pressure to achieve equivalent quality moldings.

13 Claims, 4 Drawing Figures

POLYTETRAFLUOROETHYLENE MOLDING POWDER

THE INVENTION

This invention relates to polytetrafluoroethylene molding powder.

PRIOR ART

Two general types of polytetrafluoroethylene (PTFE) are available, the granular type, usually called molding powder, and the fine powder type which is obtained from aqueous dispersion polymerization. Both types are made by pressuring tetrafluoroethylene into a stirred aqueous solution of free radical polymerization initiator, under polymerizing conditions. In aqueous dispersion polymerization, the stirring is slow enough and sufficient dispersing agent is present that the PTFE is obtained in the form of colloidal-size particles less than one micron in diameter, which remain dispersed in the aqueous medium when polymerization is stopped. Upon coagulation of the particles and drying, the fine powder type of PTFE is obtained.

In granular polymerization, the stirring (or agitation) is sufficiently rapid to cause coagulation of the polymer particles during the polymerization. Dispersing agent is generally not present except perhaps in smaller than dispersion-stabilizing amounts for the different purpose disclosed in U.S. Pat. No. 3,245,972 to Anderson et al. When polymerization is stopped, the resultant granular polymer is in the form of relatively coarse particles, some 1000 microns in diameter and larger. Normally, this polymer is subjected to coarse or fine grinding to provide the molding powders commercially available.

These two different types of PTFE have quite different and mutually exclusive molding characteristics. PTFE fine powder is fabricated by blending with an oil lubrication aid in about an 80:20 parts by weight proportion and the resultant pasty mass is extruded, generally at room temperature, this process being called paste extrusion. PTFE molding powder is fabricated by (a) pressing in a mold, followed by sintering of the resultant preform without application of pressure, or (b) ram extrusion, which involves ramming the powder through a heated orifice, which sinters the powder under pressure. PTFE fine powder is not fabricable except as small moldings (generally less than 30 grams) by the preform/free sinter technique, or by ram extrusion, and conversely, PTFE molding powder is not paste extrudable.

Because of the different polymerization techniques involved in making the two types of PTFE and their different methods of fabrication leading generally to the application of these types in different fields, the technology of these two types has been separate and independent from one another. An exception to this is U.S. Pat. No. 3,087,921 to Mathews and Roberts, which discloses the making of PTFE molding powder having good handling characteristics and high apparent density by subjecting either a previously available PTFE molding powder or PTFE fine powder to the steps of (a) compacting the PTFE to a density of at least 2.15 g/cc at pressing conditions of 50° to 300°C. and pressures of 1000 psi (70 kg/cm$^2$) to 3000 psi (211 kg/cm$^2$), (b) cooling the compacted polymer, and (c) comminuting the cooled, compacted polymer to particles having an average particle diameter of smaller than 1000 microns and preferably from 200 to 500 microns (the wet sieve $d_{50}$ particle size of 350 to 650 microns for uncompacted PTFE fine powder is the particle size of the loose agglomerates formed by coagulating the colloidal size polymer particles). While this treatment increases the powder flow for the PTFE fine powder from an essentially no-flow condition to 17 g/sec and increases apparent density from 400 to 600 g/l to 800 to 1000 g/l, the tensile strength of the PTFE molding powder made from the PTFE fine powder is only 1650 psi (116 kg/cm$^2$), which is poor at best, especially as compared to the minimum tensile strength of 4000 psi (280 kg/cm$^2$) for ASTM Type IV, which is the highest quality PTFE molding powder.

THE PRESENT INVENTION

The present invention provides a high quality polytetrafluoroethylene molding powder which can be obtained from PTFE fine powder or from special techniques applied to existing PTFE molding powder. Specifically, the polytetrafluoroethylene molding powder of the present invention can be characterized as having a specific surface area of at least 1.5m$^2$/g, as being finely divided as evidenced by an average particle diameter of less than 100 microns, and having the combination of high moldability and high apparent density, as evidenced by an apparent density of at least 500 g/l and related to moldability by the following equation:

$$\text{Apparent density} \geq 500 + 3.00\ (\Delta\ SG_{5-1}) \qquad (1)$$

wherein $\Delta\ SG_{5-1}$ is 1000 times the difference in specific gravities of the sintered molding made at preform pressures of 1000 psi (70 kg/cm$^2$) and 5000 psi (352 kg/cm$^2$) (the procedure for determining $\Delta\ SG_{5-1}$ is described further hereinafter) wherein $\Delta\ SG_{5-1}$ is no greater than 75.

The larger the difference between the specific gravity values at 70 kg/cm$^2$ and 352 kg/cm$^2$, or in other words the higher the $\Delta\ SG_{5-1}$ value, the more voidy would be the sintered article made from the low pressure preform. This voidiness would result in reduced tensile and dielectric strength and thus poor quality of the sintered article. In commercial practice, voidy sintered article can often be prevented by the use of high preform pressures but this requires more massive, and thus more expensive, preforming equipment.

Thus, the lower the $\Delta\ SG_{5-1}$, the lower is the voidiness and the better is the quality of the sintered article. Low $\Delta\ SG_{5-1}$ values are thus indicative of high quality moldings made from the molding powder, or in other words, high moldability. The $\Delta\ SG_{5-1}$ value is also referred to herein as moldability index (at 5−1 unless otherwise indicated). A preferred moldability index for molding powders of this invention is no greater than 60.

The low moldability indexes exhibited by the molding powders of the present invention in combination with their small particle size correspond to high tensile strengths for objects made therefrom, which have a tensile strength of at least 3500 psi (245 kg/cm$^2$) and preferably at least 4000 psi (280 kg/cm$^2$). The standard tensile strength test is done on sintered objects molded at 5000 psi (352 kg/cm$^2$) preform pressure. The low moldability indexes for molding powders of the present invention enables these tensile strengths to be achieved at only 1000 psi (70 kg/cm$^2$) preform pressures.

By way of comparison, the moldability index of the Mathews and Roberts molding powder which is made from densified granular polymer and which has a higher tensile strength than the molding powder made from densified dispersion polymer (2150 psi v. 1650 psi) is 89 as reported in comparative Example 8 of Roberts and Anderson, U.S. Pat. No. 3,766,133. This high moldability index is obtained from the difference between specific gravities at preform pressures which are closer together, viz. 2000 psi and 5000 psi, than the test used in the present invention. At the preform pressures of 1000 psi and 5000 psi used in the present invention, the moldability index of the Mathews and Roberts product would be much higher than 89. To illustrate, the lowest moldability index value reported for a high apparent density molding powder (565 g/l) in U.S. Pat. No. 3,245,972 to Anderson, Edens, and Larson is 15, based on specific gravities taken on samples made at 2000 and 5000 psi preform pressure ($\Delta SG_{5-2}$). At preform pressures of 1000 and 5000 psi, this moldability index (of 15) increases to about 75. A molding powder of the present invention that has a moldability index (5—1) of 75 has an extremely high and desirable apparent density of at least 700 g/l.

FIG. 1 of the drawings accompanying this invention shows a graph of apparent density versus $\Delta SG_{5-1}$ (calculated from preforms pressed at 1000 psi (70 kg/cm$^2$) and 5000 psi (352 kg/cm$^2$)). The numbers plotted in the graph correspond to the molding powders of the Examples disclosed later herein.

The letters shown on the graph are located at points where other high performance fine ground PTFE molding powders, prior to the present invention, fall in terms of their apparent densities and $\Delta SG_{5-1}$'s. The molding powders are as follows:

A. "Algoflon" F-2 (Montecatini Edison)
B. "Hostaflon" TF-17 (Farbwerke Hoechst)
"Polyflon" M12 (Daikin Kogyo)
D. "Fluon" G 163 (I.C.I.)
E. "Halon" G-80 (Allied Chemical, U.S. Pat. No. 3,640,984)
F. "Teflon" 7A (DuPont)
G. "Teflon" 7B (Dupont)
H. Example 1, U.S. Pat. No. 3,690,569
I. Sample (g) of Example 4 of U.S. Pat. No. 3,690,569

The average particle diameter of all these molding powders falls within the range 10 to 100 microns. The Anderson, Edens and Larson molding powder is not included in the graph because it is not finely ground; the coarse grinding practiced therein gives an average particle diameter in the range of about 400 to 500 microns. Finely ground molding powders have the advantage over coarsely ground resins of being preformable and free sinterable to moldings of improved mechanical and electrical properties. In addition, the finer ground molding powders are more suitable for blending with particulate fillers to give filled molding powders, which are widely used for their property advantages, especially wear resistance.

The data points shown by numbers and letters in the graph are about at midpoint of their respective numbers and letters.

Curve 1 in FIG. 1 is the line represented by equation (1). Curve 2 in FIG. 1 is the line and lower boundary of the preferred AD vs. $\Delta SG_{5-1}$ relationship represented by the following equation:

$$AD \geq 600 + 3.00(\Delta SG_{5-1}) \tag{2}$$

Curve 3 in FIG. 1 is the line represented by the following equation:

$$AD \geq 400 + 3.00 (\Delta SG_{5-1}) \tag{3}$$

From FIG. 1 it is seen that except for molding powder I which is considered undesirable in U.S. Pat. 3,690,569, all the lettered molding powders fall below curve 3, well removed from the molding powders of the present invention which fall on or above curve 1. The slope of curve 3 approximately corresponds to the effect of finer grinding to improve moldability (low $\Delta SG_{5-1}$ value) which results in decreasing apparent density. The smaller the average particle diameter for these molding powders, the lower is their apparent density. This is the effect of the very fine grinding disclosed in Kometani et al. U.S. Pat. No. 3,726,483.

Figure 2:
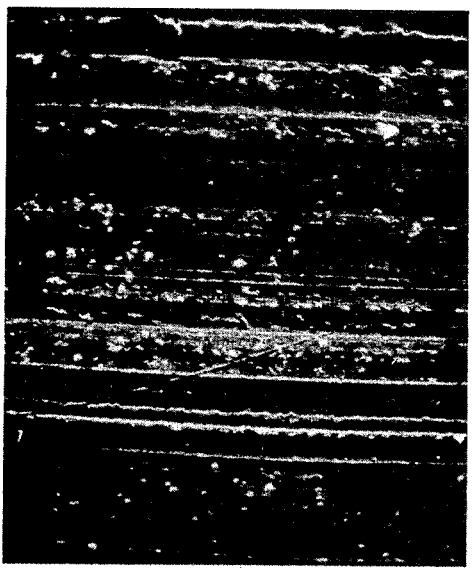
Figure 3:
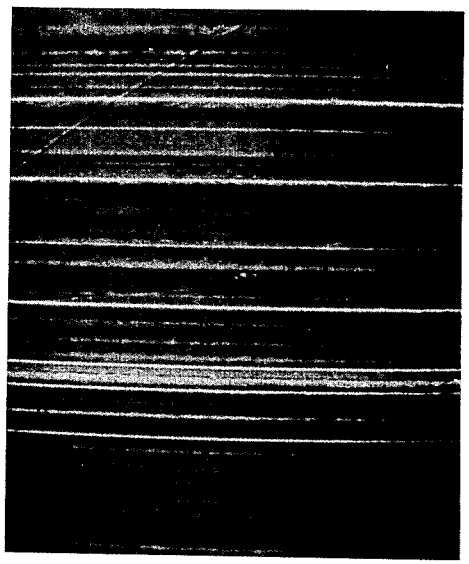

FIGS. 2 and 3 are photomicrographs at a magnification 100× of crossections of skived tapes skived from billets of sintered molding powder. In FIG. 2, the molding powder making up the skived tape is Halon G-80. The light colored spots in these Figures are voids in the tape, which render them unsuitable for some applications, such as insulation of electrical wire and cable.

In FIG. 3, the molding powder is representative of the molding powder of Example 25 before agitation with water, and the beneficial effect of its high moldability (low $\Delta SG_{5-1}$) is shown by the absence of voids in the tape.

Figure 4:
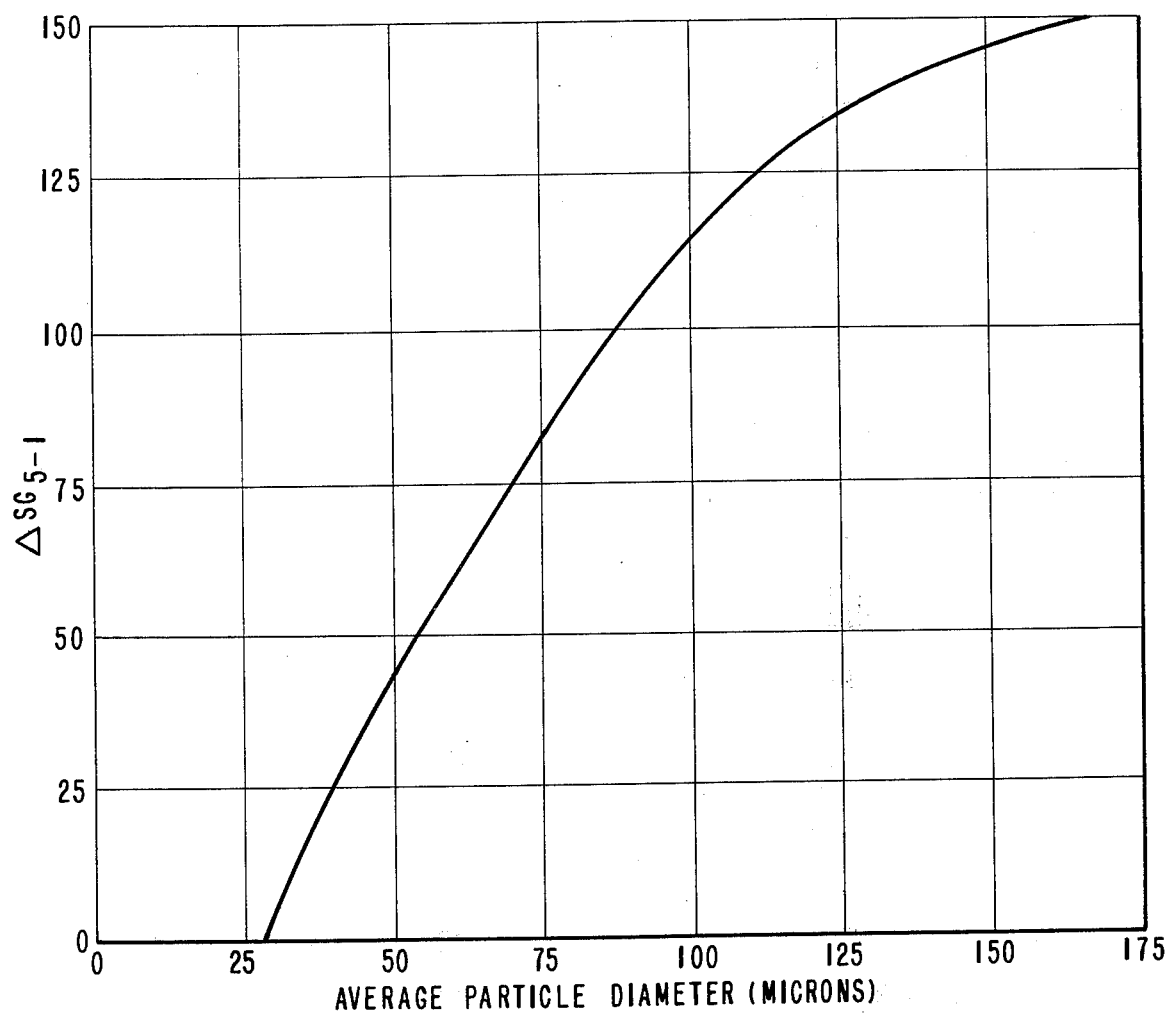

FIG. 4 is a graph showing the variation of $\Delta SG_{5-1}$ with average particle diameter of molding powder derived from PTFE fine powder.

The molding powders of the present invention are obtainable from diverse sources, from the aqueous dispersion or fine powder type of polytetrafluoroethylene and from the granular or molding powder type of polytetrafluoroethylene.

MOLDING POWDER OF THE PRESENT INVENTION MADE FROM PTFE FINE POWDER

With respect to aqueous dispersion PTFE as the source, this starting material is known in the art, disclosed for example in the aforementioned Mathews and Roberts patent and in greater detail in U.S. Pat. No. 2,559,752 to Berry. This type of PTFE is used in the coagulated form, often called "fine powder."

The first step in the conversion of this coagulated aqueous dispersion PTFE to molding powder is to compact this PTFE under high pressure at room temperature, i.e. 20° to 30°C., in a pressure device, such as a molding press or compacting rolls. Pressures ranging from 8000 psi (562 kg/cm$^2$) to 50,000 psi (3513 kg/cm$^2$) can be used. The coagulated aqueous dispersion PTFE can be wet at the time of compaction, i.e. still contain some of the aqueous polymerization medium therein, or can be dry.

The second step is to break up, i.e. partially decompact, the compact into particles having an average diameter less than 100 microns. Although this decompacting it not considered grinding because the particles making up the compact are already much smaller than the particles resulting from decompacting, conventional grinding equipment can be used to do the decompacting. Such equipment includes high speed cutter millsrun in water, such as the "Taylor Stiles Giant Mill " (Taylor Stiles Co.), which decompact in water; and fluid energy mills, such as a "Micronizer" (Sturtevant Mill Co.), which decompact the compact in the dry state. Prior to feeding the compact to such mills, it may have to be broken into relatively coarse chunks of a size which can be fed to the mill. If wet milling is done, this is followed by drying. The resultant partially decompacted material is the molding powder of the present invention.

The molding powder of the present invention prepared by this route of compaction and decompaction of the fine powder type of PTFE is distinguished from the starting fine powder in several ways. First, the product of the invention has a preform porosity at a preform pressure of 1000 psi (70 kg/cm$^2$) of no greater than 0.20 and preferably less than 0.17. In fact, many molding powders obtained from this route have a porosity below 0.15, showing excellent low pressure preformability. In contrast, the fine powder starting materials have a porosity well above 0.20, indicating poor low pressure preformability. The significance of this difference in porosity values is that while the fine powder is not sinterable to massive articles without cracking, the molding powder obtained therefrom by the present invention is sinterable without cracking. Second, mold shrinkage at 1000 psi preform pressure (% S(1000)) of the fine powder starting material is greater than 8.0, while %S (1000) of the product of the process is less than 8.0 and preferably no greater than 7.2. This lower shrinkage is an advantage in that it is less difficult to design a mold to make a product of a given size. Third, mold shrinkage at 5000 psi preform pressure (% S (5000)) of fine powder will be substantially reduced in the molding powder made therefrom. Generally, the % S (5000) of fine powder is greater than 3.7, and the molding powder of the present invention obtained therefrom has a % S (5000) of no greater than 3.7. Finally, the product of the invention is moldable by molding powder techniques, while fine powder tends to stick to the mold and to crack on preforming or sintering.

Typical molding powder of the invention derived from fine powder as described hereinbefore has been molded extensively, the results indicating that typical molding powder is comparable to a high quality finely ground granular PTFE and in some respects superior. Commercial fine powder PTFE is not suitable for molding by preforming and sintering because it sticks to the mold and cracks badly. Hundreds of 5.72 cm, 7.62 cm, and 10.15 cm diameter cylinders have been made from the molding powder of the present invention, derived from fine powder, and no mold sticking has been observed. The resultant sintered cylinders, including the 10.15 cm cylinders (weighing 0.908 kg), have been just as crack-free as controls made from high quality finely ground PTFE molding powder (made from molding powder, i.e., granular resin) available heretofore. No cracks were found in 5.72 cm or 7.62 cm cylinders.

Moldings made from the molding powder derived from fine powder have a very smooth surface, and tape skived from these moldings has a uniform void-free appearance as shown in FIG. 3. This molding powder sinters to a clear, transparent, self-supporting melt, whereas finely-ground granular resin available heretofore gives a cloudy melt. A clear melt is advantageous, because the user can look in the oven and see whether sintering is complete, i.e., the melt is clear, after which the cooling cycle can be started. The high quality of the skived tapes is illustrated by their having a dielectric strength in excess of 1800 volts/mil (700 kv/cm) on 5 mil (127 micron) thick samples prepared as described below.

To illustrate the good mechanical and electrical properties of a molding powder of the present invention derived from fine powder, the molding powder has a tensile strength of 4550 psi (320 kg/cm$^2$), an elongation of 320% and a dielectric strength of 1880 volts/mil (740 kv/cm), measured on 5 mil (127 micron) tape skived from 5.72 cm diameter solid billets sintered for 5 hours at 380°C and cooled at 2°–3°C/minute. Elongation and dielectric strength compare with side-by-side controls of other representative PTFE molding powders as follows:

| Resin | Elongation % | Dielectric Strength kv/cm |
|---|---|---|
| Typical molding powder of this invention derived from fine powder | 320 | 740 |
| Representative commercial finely ground molding powder | | |
| A Molding Powder E (FIG. 1) | 285 | 729 |
| B Molding Powder F (FIG. 1) | 280 | 828 |

Preforming of the billet was done at 176 kg/cm$^2$. When the preform pressure was only 70 kg/cm$^2$, the molding powder still gave a dielectric strength superior to that of commercially available finely ground molding powder, owing to the improved physical uniformity of the tape as is observable, for example, by comparing the tape of FIG. 3 with the tape of FIG. 2. Specifically, at 70 kg/cm$^2$ preform pressure, 5-mil (127 micron) thick tape skived from the sintered preform of molding powder of the present invention exhibited a dielectric strength of 768 k volts/cm, as compared to only 433 kv/cm for molding powder B and 295 kv/cm for molding powder A above.

MOLDING POWDER OF THE PRESENT INVENTION MADE FROM PTFE MOLDING POWDER (GRANULAR RESIN)

With respect to the granular type PTFE as the starting material for molding powder of the present invention, it has been discovered that the granular type of PTFE consists of two fractions, one of which is soft and the other of which is hard, intimately associated with one another. The soft fraction is referred to herein as alpha resin and the hard fraction as beta resin. As part of the present invention, it has been found that raw ("as polymerized") granular resins contain fractions of alpha and beta resin in proportions depending on polymerization conditions. For example, by increasing the percent solids to which the polymerization is conducted, the proportion of beta fraction is increased.

In the commercial fine grinding of granular PTFE, it has also been found that the two fractions tend to become dissociated from one another as separate particles. Specifically, the alpha resin grinds more rapidly, i.e. about 10× as fast, than the beta resin so that when the grinding mill is shut down after lengthy running, the resin that is in the recycle line because it is oversized is primarily beta resin. This resin in the recycle line is called the mill residue when the mill is shut down and represents a very small proportion of the total feed to the mill, depending on the running time for the mill. Because this mill residue was still coarse or large in particle size relative to the average diameter present in the desired product of the mill, the mill residue was heretofore discarded. This residue from the making of the major finely ground molding powders heretofore available had the following characteristics:

rated beta fraction or mill residue of beta resin is then subjected to further fine grinding to increase its specific surface area and tensile strength. It then becomes the product of the invention. This fine ground beta resin molding powder contrary to usual experience, has a high apparent density as stated in the description of molding powder of the present invention hereinbefore. This is made possible by the low alpha resin content or

CHARACTERISTICS OF MILL RESIDUES

| | Residue from fine milling of granular resin in a beater type mill[1] in which the following molding powder is the mill effluent (product) | | Residue from fine milling of Allied "Halon" G-10 molding powder in "Jet-O-Mizer" fluid energy mill[2] |
|---|---|---|---|
| | High AEF[3] fine ground granular | Low AEF[3] fine ground granular | |
| Calc. Apparent density (g/l) | 544 | 620 | 670 |
| Subsieve size | 11.8 | 15.2 | 17.4 |
| Average particle dia(microns) × $\sqrt{\text{rho}}$ (by "Micromerograph") | 65 | 57 | 118 |
| Specific surface area | 1.06 | 0.86 | 1.24 |
| Tensile strength psi | 2909 | 3738 | 3958 |
| Tensile strength kg/cm$^2$ | 204 | 262 | 277 |

[1]Has moving grinding elements within mill as compared to fluid energy mill which does not.
[2]Fluid Energy Processing and Equipment Co.
[3]AEF is anisotropic expansion factor which is explained hereinafter; high AEF results from fibrous molding powder particles and low AEF results from low fibricity of the molding powder particles.

The molding powder of the present invention as broadly defined differs from these mill residues by having a higher specific surface area and higher tensile strength. While the molding powders made in the grinding operation that produced these mill residues had relatively high specific surface areas, the mill residues had very low specific surface areas. The increase in the maximum specific surface area of the mill residue from 1.24 to the minimum of 1.5 m$^2$/g for the molding powder of the present invention is an increase of at least 25%. This corresponds to a minimum decrease in particle size of at least that proportion. The desired finely ground molding powders obtained from the mills were a mixture of predominately beta resin containing some alpha resin.

To make the molding powder of the present invention, (a) the beta resin is first separated from a mixture of beta resin and alpha resin and (b) then this separated beta resin is converted by further milling to the improved molding powder having the desirable combination of properties stated hereinbefore. The better the degree of separation in step (a), the higher will the apparent density be for a given degree of milling in step (b).

While mill residue represents a separation of sorts in which only an infinitesimal proportion of isolated beta resin is obtained in a commercial milling operation, the separation is more economically done by classifying finely ground molding powder into approximate alpha and beta fractions, which is possible because the harder-to-grind beta fraction has a greater average particle diameter than the alpha fraction after a limited grinding time. After the alpha fraction is sufficiently ground to leave the mill, only the beta fraction remains, thereby accomplishing the separation of the alpha fraction from the beta fraction.

The resultant beta fraction obtained by this classification is too coarse, as in the case of mill residue, to have good moldability properties by itself. This separation of the alpha resin in the fine ground beta resin.

Examples of grinding mills for this fine grinding that can be used are the Micronizer, the "Hurricane Mill" (Microcyclomat Co.) (U.S. Pat. No. 2,936,301), and the "Jet-O-Mizer" (U.S. Pat. No. 3,640,984).

The finely ground molding powder and the mill residue obtained therefrom having a major proportion of both beta resin and alpha resin cannot be finely ground into the apparent density/moldability index region of the present invention because the apparent density of the alpha fraction is relatively low to begin with, and the finer grinding would amount to overgrinding of any alpha resin present, causing a further lowering of the apparent density of the overall molding powder. The effect of the fine grinding in producing low apparent density is seen for molding powders A–G in FIG. 1, the low apparent densities stemming from the alpha resin content of these molding powders.

In addition to relative hardness that distinguishes particles of beta resin from those of alpha resin, the beta resin particles are also distinguishable by shape, i.e., the finely ground beta resin particles are smooth surfaced and have the general shape of flattened spheres whereas the finely ground alpha resin particles are fluffy in appearance. In addition, individual particles of the molding powder of the present invention which consists of fine ground beta resin are characteristically birefrigent showing the maltese cross typical of single crystals under a microscope illuminated with polyarized light, whereas alpha particles do not show this characteristic appearance. The particles of the molding powder derived from fine powder according to this invention also exhibit this birefringence.

In addition to high AD and low $\Delta SG_{5-1}$, molding powder of finely ground beta resin is notable for its low anisotropic behavior during molding. This means that a preform of the molding powder shrinks relatively uniformly in all directions when sintered. This makes it easier for the user to design and use a mold to obtain a sintered part of the desired dimensions. Anisotropic behavior is measured as (S). Desirable low anisotropic behavior is indicated by an (S) absolute value of less than 0.8 (i.e., between −0.8 and +0.8) and preferably less than 0.5 (i.e., between −0.5 and +0.5) for the molding powders of the present invention. The closer the (S) value is to zero, the better is the molding powder in this respect. Other finely ground granular resins have greater (S) values, e.g., −1.23 and −1.0 for molding powders F and E of FIG. 1.

The molding powders of the present invention, whether derived from fine powder or by finer grinding of coarse beta resin particles, have somewhat better flowability (powder flow) than the fine ground resin of U.S. Pat. No. 2,936,301 to Thomas and Wallace. Powder flow can be further improved to form a free-flowing moldig powder by forming agglomerates of the molding powder, e.g., average agglomerate diameter of 300 to 1000 microns, using water, an organic wetting liquid, or an immiscible mixture thereof as agglomeration media.

The molding powders of the present invention in the preferred sense have a moldability index ($\Delta SG_{5-1}$) of no greater than 30 and an average particle diameter of no greater than 60 microns. Molding powder of finely ground beta resin preferably has a $\Delta SG_{5-1}$ of less than 15 and average particle diameter of less than 20 microns. Some of these molding powders exhibit $\Delta SG_{5-1}$ values of zero, which means that the molding powder has extremely good sinterability at 1000 psi (70 kg/cm$^2$). Such molding powders of the present invention can be preformed at pressures as low as 500 psi (35 kg/cm$^2$) or even 200 psi (14 kg/cm$^2$) and still be sintered to dense, strong moldings. Preferably, the molding powder of the present invention has an average particle diameter of at least 10 microns.

The molding powders of the present invention consist of high molecular weight PTFE, which means that these molding powders are fabricable by the non-melt fabrication processes used on the conventional PTFE molding powders. One measure of high molecular weight is that the molding powder of the present invention has an apparent melt viscosity of at least $1 \times 10^9$ poises at 380°C.

The PTFE from which the molding powder of the present invention is made can also contain a small proportion of fluorinated terminally unsaturated comonomer content, e.g. 0.01 to 0.5% based on the total weight of the copolymer. Preferred comonomers are the perfluoroalkenes and perfluoro(alkyl vinyl ethers), each containing 3 to 8 carbon atoms. The comonomer contributes high toughness and high flex life to the molding powder.

TEST PROCEDURES

Test results reported herein are determined according to the following test procedures:

Calc. AD — Calculated apparent density is determined by measuring the volume occupied by the powder comprising 1 cm$^3$ of pore-free polymer contained in the specimen tube used for the subsieve size test. This volume is termed the bulk factor. Calc. AD = 2285/bulk factor. The units of apparent density are grams/liter. The value obtained in this measurement is always close to but not necessarily identical with the value for apparent density as measured by the procedure of ASTM 1457. The reason for use of calc. AD rather than the ASTM procedure is the requirement for 2.285 grams of sample rather than a quantity that may be as large as 200 grams.

Specific Surface Area (SSA) — The specific surface area of a sample of powder is the number of square meters of surface per gram of polymer as measured by a nitrogen adsorption technique. The measurements of this parameter were all made using a modified gas chromatographic technique with the instrument being calibrated for each run with a sample of polytetrafluoroethylene on which the surface area was measured using the standard BET procedure described by Barr and Anhorn in Chapter XII of "Scientific and Industrial Glassblowing and Laboratory Techniques" published in 1949 by Instrument Publishing Company. All of the molding powders of the present invention prepared in the Examples herein have an SSA of at least 1.5 m$^2$/g. PTFE fine powder as a starting material has an SSA of at least 9 m$^2$/g, and after the compaction and decompaction steps, the SSA is still well above 1.5 m$^2$/g.

Subsieve Size (SSS) — This is a number expressed in microns determined on an apparatus made by the Fisher Scientific Company and called a subsieve sizer. The procedure is essentially that described in ASTM Standard B-330-58T using a porosity value in the determination of 0.55 using a sample size for unfilled resin of 2.28 grams. SSS is a measure of air permeability, which is a function of particle size and porosity. For series of samples in which porosity does not vary, SSS is a measure of average particle size.

SSG — The standard specific gravity is measured on samples preformed at 5000 psi (or 352 kg/cm$^2$). The test procedure is described in ASTM D 1457-69, except that the preforming die used is 2.86 cm in diameter and a charge of 12.0 g of polymer is used. The sintering cycle includes a step of heating up the specimen from 300° to 380°C. at 2°C/min. After the specified 30 minutes at 380°C. the oven is cooled to 295°C. at 1°C. per minute and held at this temperature for 25 minutes after which the specimen is removed and cooled to room temperature and the standard specific gravity is determined as specified in D 1457-69. SG (1000) means that the SSG procedure was followed except that the specific gravity is determined on a sintered preform molded at 1000 psi instead of 5000 psi. SSG increases with the rate of crystallization, and (for homopolymers at least) rate of crystallization decreases with increasing molecular weight. Thus SSG measurements before and after a process give a measure of molecular weight change due to that process.

$\Delta SG_{5-1}$ — Delta specific gravity (moldability index 5−1) involves determination of the specific gravity of a sintered specimen prepared as in the SSG procedure except that the preform pressure used is 1000 psi (70 kg/cm$^2$). $\Delta SG_{5-1}$ = 1000 (SSG (5000 psi preform pressure) − SG (1000 psi preform pressure)). When the term moldability index is used for $\Delta SG_{5-2}$, such moldability index is defined as 1000 × (difference between the specific gravity of moldings made at 5000 and 2000 psi preform pressures).

% S (5000) — The precent shrinkage is the percent decrease in diameter between the preform and final sintered piece of the test specimen used to determine SSG with the measurement being carried out in the direction perpendicular to the direction of applied preform pressures (lateral change). A value obtained for % S varies appreciably with preform pressure and even with details of application of the preform pressure. % S (1000) is the same with a preform pressure of 1000 psi (70 kg/cm²) instead of 5000 psi (352 kg/cm²).

(S) is the symbol used for a constant in an equation used to predict lateral and axial dimensional changes during sintering. (S) is a measure of the elastic memory or fibrousness of the polymer particles and has been shown experimentally to be essentially constant with preform pressure rather than varying widely as does percent shrinkage. If one knows the void volume of a preform it is possible to calculate dimensional changes in both the axial and lateral direction of a molding by using (S) according to the equations 4a and 4b below. The value of (S) is determined from %S as shown in equation 5 below, using a preform pressure of 352 kg/cm². The closer (S) is to zero, the more isotropic is the behavior of the sample.

Eq. 4a — calculated lateral change $$\% \text{ shrinkage} = 100 \{1 - [\sqrt[3]{(\text{preform density/sintered density})} \times [1 + 0.01 \ (S)] \times (0.9667 + 0.1025 \ \psi_G - 0.0844 \ \psi_G^2)]\}$$

where $\psi_G$ = Void fraction of the preform.
To a good approximation $\Psi_G = 1 - $ (preform density/2.285)

Eq. 4b — calculate axial change $$\% \text{ growth} = 100 \{[\sqrt[3]{(\text{preform density/sintered density})} \times [1/(1 + 0.01 \ (S))^2] \times (1.069 - 0.224 \ \psi_G + 0.1979 \ \psi_G^2)] - 1\}$$

Eq. 5 — calculate (S) — measure of elastic memory of particles in mold $$(S) = 100 \{[1 + 0.01 \ (\% \ S)]/[\sqrt[3]{(\text{preform density/sintered density})} \times (0.9667 + 0.1025 \ \Psi_G - 0.0844 \ \Psi_G^2)] - 1\}$$

Porosity — The porosity is the void fraction in (Cm³ voids)/(cm³ total volume) of the preform used to prepare the specimen for the SG (1000) determination as defined above. It is indicative of the preformability of a resin.

Tensile Strength — is the stress at rupture in kg/cm² of original cross-sectional area of a tensile strength test specimen of the dimensions specified in ASTM D-1457-69 preformed at 5000 psi (or 352 kg/cm²) and sintered according to the schedule described under SSG, unless otherwise specified.

AEF (anisotropic expansion factor) is a measure of the dimensional change obtained on sintering. The value is obtained as follows: Twelve grams of powder is weighed into a 1⅛ inches (2.86 cm) diameter mold and compressed to 352 kg/cm² during 1 minute, held for 2 minutes, and then released. The diameter and height of the preform are measured and the preform is sintered by the same sintering cycle as under SSG. The sintered thickness and diameter are then obtained and anisotropic expansion factor is then the value of $$T_s/T_p \div D_s/D_p$$

when $T_s$ and $T_p$ are thickness of sintered resin and preform, respectively.

when $D_s$ and $D_p$ are diameter of sintered piece and preform, respectively.

% E — is the percent elongation of the Tensile Strength (TS) test specimen at rupture.

Powder Flow — The polymer sample is used to fill a vertical polytetrafluoroethylene pipe 22.8 cm high and 5.08 cm in diameter and having a 6 mesh screen attached across the base of the pipe. The pipe is subjected to vibration having a frequency of 675 cycles/minute and an amplitude of 0.762 cm. The amount of powder flowing through the screen is continuously weighed and recorded. From the resulting curve the powder flow is calculated as grams/second.

Particle size disclosed herein unless otherwise specified is the weight average particle diameter ($d_{50}$) of the molding powder determined by the wet sieve procedure disclosed in U.S. Pat. No. 2,936,301. Standard sieves for wet sieve analysis are not readily available in sizes smaller than 37 microns and the wet sieve method is not applicable to very small particles. The weight average particle diameter of particles smaller than 37 microns is determined by the "Micromerograph" method described in U.S. Pat. No. 3,265,679, unless otherwise indicated herein. Results from Micromerograph determinations are in units of $d$ (microns) × $\sqrt{rho}$ where rho is the density of the particle. This density is not known but is believed to vary with particle size and type (alpha or beta resin). The density is expected to vary from about 0.8 to 2.28. The corresponding square root values vary from about 0.9 to 1.5 and the actual average size in microns, therefore, is usually somewhat less than the value of $d \sqrt{rho}$ reported. In most instances, particle size values obtained by one of these tests were confirmed qualitatively by optical microscopy.

The average particle diameter, $d_{50}$, of agglomerated powders is determined by the wet sieving procedure of ASTM D-1457-69, but selecting a set of sieves in the square root of 2 series starting with 1000 microns recommended by the International Standards Organization. The particle size of the basic or primary particles of PTFE fine powder is determined by observation through an electron microscope.

Apparent melt viscosity is calculated by measuring the tensile creep of a sintered piece held at 380°C. Specifically, 12 g. of molding powder is placed in a 7.6 cm diameter mold between 0.152 cm rubber cauls and paper spacers. The mold is then heated at 100°C. for 1 hour. Pressure is then slowly applied on the mold until a value of 140.6 kg/cm² is obtained. This pressure is held for 5 minutes and then released slowly. After the sample disc is removed from the mold and separated from the cauls and paper spacers, it is sintered at 380°C for 30 minutes. The oven is then cooled to 290°C. at a rate of about 1°C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar oven where the 4 cm. test length is brought to a temperature of 380° ± 2°C. A weight is then attached to the bottom quartz rod to give a total weight suspended from the sample sliver of about 4 g. The elongation measurements vs. time are obtained, and the best average value for the creep curve in the interval between 30 and 60 minutes is measured. The specific melt viscosity, which may be better called apparent melt viscosity, is then calculated from the relationship $$\eta \text{ app} = \frac{WL_g}{3(dL_T/dt)A_T}$$

(molding powder of fine ground beta resin of this invention) was about 70% of the feed and weighed 354 g and is the molding powder of this invention. The characterization of the products is in Table I.

TABLE I

|  | Teflon 7A Feed | Coarse Beta Residue | Final Effluent of Grinding Coarse Beta Residue (Molding Powder of This Invention Plotted as 1 in Figure 1) |
|---|---|---|---|
| Calc. AD-g/l | 507 | 790 | 577 |
| $\Delta SG_{5-1}$ | 38 | 29 | 0 |
| SSG | 2.164 | 2.181 | 2.177 |
| (S) | −0.89 | ca. zero | −0.748 |
| SSS, microns | 7.60 | 9.6 | 4.65 |
| SSA-m²/g | 2.90 | 1.25 | 2.24 |
| $d_{50}$, microns × $\sqrt{rho}$ (by "Micromerograph") | 39 | 36 | 21 |
| Optical microscopy particle size range, microns | 3–60 | 30–50 | 5–20 | where $\eta$app = (apparent) melt viscosity in shear, poises
$W$ = tensile load on sample, g
$L_T$ = length of sample (at 380°C.) cms. (4.32 cm)
$g$ = gravitational constant, 980 cm./sec.²
$(dL_T/dt)$ = rate of elongation of sample under load = slope of elongation vs. time plot, cm./sec.
$A_T$ = cross-sectional area of sample (at 380°C.), cm² — area increases 37% at 380°C. over that at room temperature Examples of molding powders of the present invention are as follows (parts and percents are by weight unless otherwise indicated):

EXAMPLE 1

In this experiment, a 20.3 cm diameter stainless steel Micronizer air mill was used. This is Model 08-5057, manufactured by Jet-Pulverizer Company, Palmyra, N.J. It is operated adiabatically — i.e., without adding or removing heat — using 2830 l/min filtered compressed air introduced at 25°C. and 6.67 kg/cm².

The feed polymer was Teflon 7A fluorocarbon resin (1967). During a 4-minute period, 200 g of the feed resin was gradually introduced into the mill at a uniform feed rate of 50 g/min. This feed rate was experimentally determined as providing the maximum separation of beta resin from alpha resin. When introduction of the polymer feed was complete, the mill was operated for one minute with no polymer feed to remove most of the remaining alpha resin as effluent. The total effluent and the residue removed from the micronizer chamber after shutdown were approximately equal in weight.

This experiment was repeated several times and the residues (coarse beta) were combined and fed into another run in the same equipment. This time the polymer feed rate was 30 g/min. The resultant effluent The molding powder of the present invention made in this Example still has high apparent density and has a much better moldability as indicated by a $\Delta SG_{5-1}$ of zero, which is indicative of a tensile strength in excess of 4000 psi (280 kg/cm²). In actual fact, the specific gravity of the sintered molding made by preforming at 1000 psi (70 kg/cm²) was 0.0007 g/cc higher than that made at 5000 psi (352 kg/cm²) preform pressure, which probably represents the degree of experimental accuracy of the test method. The significance of zero $\Delta SG_{5-1}$ is that this molding powder can be preformed at very low pressures to give preforms which will sinter to high quality moldings. To illustrate, to obtain a positive value of $\Delta SG$, the low pressure preform pressure would have to be lowered, e.g., to 700 psi or 500 psi (49 kg/cm²) or (35 kg/cm²). Preformability at this low pressure is unique in the molding powder art. The high degree of compactness of the preforms is indicated by the porosity at 70 kg/cm² being 0.15. This porosity value is much less than for the fine powder type of PTFE and is similar to porosity values of other finely ground PTFE molding powders, but the sinterability as indicated by $\Delta SG_{5-1}$ of zero is much better than other finely ground molding powders of similarly high apparent densities. Shrinkage values, S(1000) of 6.32%, S(5000) of 2.94% and AEF of 1.124 for the molding powder of this invention all compare favorably with commercial finely ground PTFE molding powders. The particles of molding powder made in this Example exhibited birefringence when viewed through a polarizing microscope.

EXAMPLE 2

A. Example 1 was repeated to obtain three pounds (1.46 kg) of molding powder of the present invention made of finely ground beta resin, with the results shown in Table II.

TABLE II

|  | Teflon 7A Feed | Effluent of 70% Alpha Resin | Final Effluent of Grinding Coarse Beta Residue (Molding Powder of Present Invention Plotted as 2 in Figure 1) |
|---|---|---|---|
| Calc. AD - g/l | 507 | 370 | 610 |
| $\Delta SG_{5-1}$ | 38 | 2.7 | 0 |
| SSG | 2.164 | 2.178 | 2.177 |
| (S) | −0.89 | −1.61 | −0.43 |
| SSS - microns | 7.60 | 4.65 | 5.10 |
| SSA - m²/g | 2.90 | 4.08 | 1.92 |
| $d_{50}$ - microns × $\sqrt{rho}$ | 39 | 20 | 22 |

TABLE II-continued

|  | Teflon 7A Feed | Effluent of 70% Alpha Resin | Final Effluent of Grinding Coarse Beta Residue (Molding Powder of Present Invention Plotted as 2 in Figure 1) |
|---|---|---|---|
| (by "Micromerograph") |  |  |  |
| AEF | 1.129 | 1.152 | 1.114 |
| % Voids in sintered molding after preforming at |  |  |  |
| 14 kg/cm² | — | — | 0.19 |
| 35 kg/cm² | ca. 2 | 0.13 | 0.18 |
| 70 kg/cm² | — | 0.25 | 0.20 |
| 352 kg/cm² | — | 0.29 | 0.28 |
| %S(5000) | 2.90 | 4.07 | 3.10 |
| Tensile strength-kg/cm² and Elongation at various preform pressures |  |  |  |
| 70 kg/cm² | 309/330% | 317/417% | 308/398% |
| 352 kg/cm² | 342/340% | 352/434% | 333/406% |

The effluent of 70% alpha resin is the product obtained from the separation of alpha resin from coarse beta resin. This coarse beta resin was then finely ground to get the final effluent which is the molding powder of finely ground beta resin of the present invention. The effluent of 70% alpha resin exhibits excellent moldability as characterized by the low $\Delta SG_{5-1}$ value of 2.7, but this improvement is obtained at the expense of decreased apparent density, increased particle fibrousness (increased (S) value), and increased shrinkage. In contrast, the final effluent from regrinding the coarse beta resin has even better moldability than the starting Teflon 7A molding powder with an even higher apparent density, decreased particle fibrousness, and at no significant sacrifice in shrinkage characteristics. The particles of the molding powder of this invention made in this Example 2A exhibited birefringence when viewed through a polarizing microscope.

B. This experiment was carried out using the fluid energy mill and polytetrafluoroethylene resin feed described in Example 1. During a 4-minute period, 200 g of the feed resin was introduced into the mill at a uniform feed rate of 50 g/min. When the introduction of the polymer feed was complete the air flow to the mill was shut off and the product receiver changed. The mill was started up and run for two minutes with no feed, and then shut off. The product receiver was changed and the mill was run again for 2 minutes collecting 18.5 grams of uniformly shaped particles having an average particle diameter of about 15 microns and exhibiting birefringence when examined with a polarizing microscope.

C. In this experiment, the micronizer was run as in Paragraph B. until the 200 g of feed polymer was introduced into the mill. The air flow was then shut off and the product fraction was isolated. The mill was opened and the residue in the mill was removed. This operation was repeated three times.

The three product fractions totalling 202 grams were combined and fed to the clean mill. This feed material is resin that had already gone through the mill one time and consisted of a mixture of 80 percent alpha and 20 percent beta resin. After the once ground material had been introduced into the mill, the mill was shut down, the product receiver changed and the mill run for 4 minutes. On opening the mill, 13.2 grams of residue resin was recovered. This material is the ground beta resin of the invention. It had a subsieve size of 6.0 and a calculated apparent density of 671 g/l. Microscopic examination with polarized light showed it to consist of uniform small (about 10 micron in average diameter) birefringent particles.

EXAMPLES 3–14

These examples show the making of molding powder of the present invention from various PTFE fine powder starting materials (Fine Powder E is used in Examples 21 and 26)

| Fine Powder | Description |
|---|---|
| A | PTFE homopolymer, SSG ca. 2.220 U.S. Pat. No. 2,559,752) |
| B | PTFE modified by hexafluoropropylene (U.S. Pat. No. 3,142,665) |
| C | PTFE modified by hexafluoropropylene (lower mol wt. than A, U.S. Pat. No. 3,142,665) |
| D | PTFE modified by perfluoropropyl vinyl ether (Ser. No. 254,014, filed May 17, 1972) |
| E | PTFE homopolymer, SSG 2.167 |

All these starting materials were large agglomerates ($d_{50}$ 400–600 microns) of tiny basic particles (0.1 –0.5 microns).

The starting fine powder (coagulated and dried aqueous dispersion PTFE) was compacted in a laboratory press at 25° C. and at various pressures. The mold was a cylinder 5.72 cm in diameter and the fine powder charge was 100 g.

The partial decompaction was accomplished in a 3.785 l. Waring Blendor (Model No. CB-5), a high-speed blade type mixing device, equipped with a 12.1 cm diameter blade, 6.35 mm wide and 3.17 mm thick leading edge, unless otherwise indicated. The broad faces of the blade move in a plane perpendicular to the vertical shaft. The resin particles are struck by the 3.17 mm thick, blunt leading edges of the blade as it rotates. During the finishing, temperature was measured with a thermocouple in the slurry and controlled by circulating ice water or hot water through the jacket of the blender. This apparatus was used at high speed for Examples 3–8, 12, 13 and 14, and their control experiments.

In some experiments, a standard blade supplied with the Waring Blendor (Examples 9, 10 and 11 and their control) was used in place of the flat blade. In other experiments, a 0.947 l. Waring Blendor was used with its standard blade (Example 8 and its control). The data tables show whether the high or low speed of the blender was used. It is estimated that with the 12.1 cm blade, the peripheral speed was 76.3 m/sec at high speed and 45.8 m/sec at low speed.

In each partial decompaction step, water at 30° C and the compacted fine powder cylinder were charged to the blender, enough water being used to give about 10–20% solids in the blender. The time of partial decompaction is shown for each experiment. The molding powder was separated and dried at 120° C. for 16 hours. Further details of these experiments and results are shown in Table III:

lute value less than 0.8, and smaller AEF. In addition, these molding powders all have a considerably higher apparent density than prior art finely ground molding powders. Examples 8–14, which are conducted under different partial decompaction conditions, show generally that the more vigorous or extensive the decompaction is, the smaller is the $\Delta SG_{5-1}$ value (improved moldability).

EXAMPLES 15 and 16

These Examples show the effect in Table IV of varying compaction pressure in the procedure used for Example 3, using fine powder A as the starting material.

TABLE III

| Example | Fine Powder Starting Material | Compaction Pressure kg/cm² | Partial decompaction Min. | Speed | AD g/l | SSG | $\Delta SG_{5-1}$ | Porosity | AEF | %S(5000) | %S(1000) | (S) | SSS microns | $d_{50}$ microns |
|---|---|---|---|---|---|---|---|---|---|---|---|---|---|---|
| Control | A | — | — | H | 456 | 2.220 | 0.8 | 0.260 | 1.120 | 4.9 | 9.9 | −1.03 | — | — |
| 3 | A | 562 | 10 | H | 713 | 2.220 | 11.3 | 0.158 | 1.089 | 2.9 | 6.0 | 0.22 | 14 | — |
| Control | B | — | — | H | 518 | 2.169 | 1.7 | 0.272 | 1.121 | 4.4 | 9.8 | — | — | — |
| 4 | B | 562 | 10 | H | 814 | 2.170 | 24.8 | 0.162 | 1.088 | 2.5 | 5.3 | 0.14 | 9.8 | — |
| Control | C | — | — | H | 495 | 2.223 | 1.2 | 0.294 | 1.120 | 5.1 | 10.6 | — | — | — |
| 5 | C | 562 | 10 | H | 760 | 2.221 | 50.6 | 0.166 | 1.094 | 3.4 | 5.6 | −0.03 | 11 | — |
| Control | D | — | — | H | 456 | 2.168 | 0.8 | 0.281 | 1.122 | 4.3 | 10.1 | — | — | — |
| 6 | D | 562 | 10 | H | 713 | 2.167 | 52.8 | 0.196 | 1.09 | 2.8 | 5.8 | −0.04 | 8.5 | — |
| Control | A | — | — | H | 506 | 2.222 | 0.7 | 0.256 | 1.170 | 5.6 | 10.2 | −2.26 | 3.0 | — |
| 7 | A | 528 | 10 | H | 671 | 2.222 | 16.3 | 0.151 | 1.103 | 3.2 | 6.1 | −0.16 | 12 | — |
| Control | A | — | — | H | 530 | 2.219 | 0.5 | 0.243 | 1.153 | 5.5 | 9.8 | — | — | — |
| 8 | A | 562 | 2 | H | 814 | 2.218 | 50.7 | 0.145 | 1.085 | 3.0 | 5.0 | 0.27 | 20 | 66.1 |
| 9 | A | 562 | 1 | L | 877 | 2.217 | 58.6 | 0.146 | 1.089 | 3.1 | 4.9 | 0.15 | 22 | 63.2 |
| 10 | A | 562 | 10 | L | 786 | 2.221 | 9.4 | 0.149 | 1.094 | 3.2 | 5.9 | 0.03 | 11 | 32.6 |
| 11 | A | 562 | 12 | H | 760 | 2.222 | 5.4 | 0.151 | 1.096 | 3.5 | 6.3 | −0.10 | 7.2 | 28.9 |
| 12 | A | 562 | 1 | L | 760 | 2.221 | 15.1 | 0.146 | 1.096 | 3.4 | 5.8 | −0.08 | 12 | 33.2 |
| 13 | A | 562 | 10 | L | 786 | 2.222 | 5.5 | 0.147 | 1.100 | 3.5 | 6.2 | −0.19 | 7.8 | — |
| 14 | A | 562 | 12 | H | 671 | 2.221 | 0 | 0.155 | 1.110 | 3.6 | 6.3 | −0.44 | 4.9 | 27.1 |

TABLE IV

|  | Control | Comparison A | Example 15 | Example 16 |
|---|---|---|---|---|
| Compaction pressure (kg/cm²) | — | 211 | 352 | 562 |
| Decompaction time (min) | — | 10 | 10 | 10 |
| AD - g/l | 530 | 393 | 543 | 651 |
| SSG | 2.219 | 2.225 | 2.224 | 2.223 |
| $\Delta SG_{5-1}$ | 0.5 | 2.7 | 2.2 | 0.6 |
| Porosity | 0.243 | 0.184 | 0.165 | 0.150 |
| AEF | 1.153 | 1.120 | 1.111 | 1.108 |
| % S (5000) | 5.5 | 4.3 | 3.8 | 3.5 |
| % S (1000) | 9.8 | 7.9 | 7.1 | 6.4 |
| SSS - microns | — | 2.3 | 4.1 | 6.0 |
| (S) | −1.90 | −0.85 | −0.50 | −0.35 |

The fine powder starting materials A, B, C and D all exhibit low $\Delta SG_{5-1}$ values, but these materials are not fabricable by molding powder techniques because of the tendency of the fine powder to stick to the preform mold and of the preform of the fine powder to crack upon sintering. This poor molding quality is caused by the high porosity (greater than 0.24) of preforms of the fine powder, high shrinkage of the sintered fine powder (% S1000 greater than 9.0) and high (S) absolute value of greater than 1.0.

On the other hand, the Examples shown in Table III are good to excellent molding powders, having low preform porosity of less than 0.20, in most cases less than 0.17, and in many cases less than 0.15, (S) abso- Comparison molding powder A, which is not a prior art molding powder, is inferior because of its low apparent density. As the compaction pressure increases to 352 kg/cm² and then to greater than 562 kg/cm², apparent density increases, moldability improves and improvements in such properties as porosity and anisotropic expansion are obtained.

EXAMPLES 17 and 18

These Examples show in Table V the effect of varying partial decompaction temperature in the procedure used for Example 3 using fine powder D as the starting material.

TABLE V

|  | Control | Comparison B | Example 17 | Example 18 |
|---|---|---|---|---|
| Comparison: |  |  |  |  |
| kg/cm² | — | 562 | 562 | 562 |
| T°C. | — | 25 | 25 | 25 |
| Decompaction - °C. | — | 80 | 7 | 35 |

TABLE V-continued

|  | Control | Comparison B | Example 17 | Example 18 |
| --- | --- | --- | --- | --- |
| min. | — | 12 | 12 | 12 |
| AD - g/l | 375 | 450 | 550 | 550 |
| SSG | 2.172 | 2.179 | 2.180 | 2.179 |
| $\Delta SG_{5-1}$ | 1.4 | 2.6 | 13.6 | 9.4 |
| Porosity | 0.247 | 0.182 | 0.163 | 0.166 |
| AEF | 1.138 | 1.121 | 1.086 | 1.106 |
| % S (5000) | 4.3 | 3.3 | 2.5 | 3.1 |
| % S (1000) | 9.1 | 6.9 | 5.5 | 6.2 |
| SSS - microns | — | 4.1 | 6.0 | 5.2 |
| (S) | −1.44 | −0.76 | 0.23 | −0.38 |

These experiments show that various decompaction temperatures can be used. In the case of Comparison B molding powder, a higher compaction pressure or shorter decompaction time would provide higher AD molding powder upon partial decompaction.

EXAMPLES 19 and 20

In these Examples, the procedure of Example 3 was repeated except as indicated in Table VI below and except that after coagulation the fine powder was not dried so that at the time of compaction, the fine powder A contained 30% by weight of water.

TABLE VI

|  | Control | Ex. 19 | Ex. 20 |
| --- | --- | --- | --- |
| Compaction kg/cm$^2$ | — | 528 | 528 |
| Decompaction time (min) | — | 4 | 10 |
| AD - g/l | 506 | 713 | 671 |
| SSG | 2.222 | 2.219 | 2.220 |
| $\Delta SG_{5-1}$ | 0.7 | 18.5 | 2.2 |
| Porosity | 0.256 | 0.168 | 0.175 |
| AEF | 1.170 | 1.108 | 1.124 |
| % S (5000) | 5.6 | 3.6 | 3.7 |
| % S (1000) | 10.2 | 6.4 | 6.9 |
| SSS microns | 3.0 | 16 | 6.5 |
| (S) | −2.26 | −0.40 | −0.76 |

EXAMPLES 21–23

These examples show that it is not necessary to use a Waring Blender for partial decompaction. In these experiments, each fine powder starting material is compacted in a press at 562 kg/cm$^2$ pressure at 25°C. Type E is the fine powder used for Example 21 and Type D is the fine powder used for Examples 22 and 23. The compacted fine powder Type E for Example 21 and Type D for Examples 22 and 23 were each mixed with water and fed continuously to a Taylor-Stiles cutter, Model TS-06, with 15.2 cm rotor blades, operating at a rotor speed of 9600 rpm and equipped with a screen across the discharge of the cutter. For Examples 21 and 22, the screen was a 30P screen (manufacturer's designation) in which the screen has a thickness of 0.21 mm, a minimum hole diameter of 0.33 mm and 14.5 percent open area. The hole has a profile starting at about 0.83 microns on one surface of the screen and then decreasing to the minimum indicated at the opposite side. For example 23 the screen was a 6OR VERO screen (manufacturer's designation). This screen has a thickness of 0.20 mm with a minimum hole diameter of 0.13 mm and 8 percent open area. The holes have a rounded profile going from about 0.42 mm diameter at one surface to the minimum given above and then increasing again to the other surface. The feed slurry at 8°C. was passed through the cutter at a water flow rate of 1360 liters/hour and polymer feed rate of 22.7 kilograms/hour.

The product was separated from the water by flotation, diluted with ten parts of fresh water and agitated in a slurry tank for 30 minutes at room temperature according to U.S. Pat. No. 3,690,569. The slurry tank was equipped with vertical baffles to increase turbulence and jacketed to control the temperature. The tank had a diameter of 45.7 cm and a height of 45.7 cm. The agitator blades were rectangular and four in number, each measuring 22.9 cm in diameter and 5.1 cm in height, with a 45° pitch. The agitator speed was 400 rpm. Further details and results of these experiments are shown in Table VII:

TABLE VII

|  | Control for Example 21 (No compaction or decompaction) | Ex. 21 | Control for Examples 22 & 23 (No compaction or decompaction) | Ex. 22 | Ex. 23 |
| --- | --- | --- | --- | --- | --- |
| Ad-g/l. | 600 | 650 | 518 | 713 | 585 |
| SSG | 2.166 | 2.168 | 2.155 | 2.155 | 2.157 |
| $\Delta SG_{5-1}$ | 0.3 | 16.6 | 0.9 | 47.6 | 2.2 |
| Porosity | 0.251 | 0.160 | 0.267 | 0.182 | 0.197 |
| AEF | 1.139 | 1.094 | 1.150 | 1.089 | 1.105 |
| % S(5000) | 4.3 | 2.5 | 4.2 | 2.5 | 3.1 |
| % S(1000) | 9.2 | 5.5 | 9.8 | 5.3 | 7.0 |
| SSS-microns | — | 5.9 | — | 7.2 | 3.1 |
| (S) | −1.48 | 0 | −1.73 | 0.06 | −0.46 |

While the control fine powders in the Table exhibit high apparent density and low $\Delta SG_{5-1}$, these fine powders are not moldable by the usual molding powder fabrication techniques, due in part to the sticky nature of the fine powder type of PTFE and in part to the high (S) value and porosity thereof. The molding powders obtained from these fine powders are moldable like PTFE molding powder.

EXAMPLES 24 and 25

These examples show in Table VIII that with the same feed resin (fine powder A), comparable results can be obtained by Waring Blender partial decompaction after 562 kg/cm$^2$ precompaction (Example 24)

and Taylor-Stiles partial decompaction followed by aqueous agitation, following precompaction at 1760 kg/cm² (Example 25).

TABLE VIII

|  | Ex. 24 (Same as Ex. 3) | Ex. 25 |
|---|---|---|
| Compaction kg/cm² | 562 | 1760 |
| temp. °C. | 25 | 25 |
| Decompaction | Waring Blendor 10 min. at 30°C. | Taylor-Stiles plus cold water wash |
| AD-g/l. | 713 | 620 |
| SSG | 2.220 | 2.226 |
| $\Delta SG_{5-1}$ | 11.3 | 1.2 |
| Porosity | 0.158 | 0.152 |
| AEF | 1.089 | 1.101 |
| % S(5000) | 2.9 | 3.4 |
| % S(1000) | 6.0 | 6.2 |
| SSS-microns | 14 | 0.2 |
| (S) | −0.22 | −0.16 |

EXAMPLES 26 and 27

These examples show in Table IX that the precompacted fine powder can be partially decompacted by air grinding rather than decompacting under water. A 20.3 cm fluid energy mill was used, as described in U.S. Pat. No. 3,726,484. The precompacted resin was broken up in a shredder through a screen having 6.35 mm apertures so the resin could be fed to the air mill.

TABLE IX

|  | Ex. 26 | Ex. 27 |
|---|---|---|
| Fine powder starting material | E | B |
| Compaction pressure, kg/cm² | 562 | 3515 |
| Compaction temperature, °C | 25 | 25 |
| Fluid energy mill feed rate, kg/hr | 31.1 | 70.5 |
| air inlet pressure, kg/cm² | 7.03 | 7.6 |
| feed air pressure, kg/cm² | 7.74 | 7.74 |
| air flow, l/m | 2830 | 2830 |
| feed air temperature, °C. | ca25 | ca25 |
| Product Ad-g/l. | 671 | 750 |
| SSG | 2.169 | 2.1834 |
| $\Delta SG_{5-1}$ | 4.5 | 3 |
| Porosity | 0.163 | 0.174 |
| AEF | 1.103 | 1.1 |
| % S (5000) | 2.7 | 2.9 |
| % S (1000) | 5.9 | 6.8 |
| SSS, microns | — | 12.1 |
| (S) | −0.03 | −0.19 |

EXAMPLE 28

In this Example, a series of compactions was carried out at 562 kg/cm² pressure and at 25°C. using fine powder A and partial decompaction was done to a varying degree to obtain the following data for the resultant molding powder of this invention.

| $d_{50}$ microns | $\Delta SG_{5-1}$ |
|---|---|
| 66 | 51 |
| 63 | 57 |
| 33 | 9.4 |
| 29 | 5.4 |
| 27 | 0 |

This data shows the general relationship of increasing moldability with decreasing particle size. These data are plotted in FIG. 4 in which the high $d_{50}$ region is plotted from the following experimentally determined information: at $d_{50}$ of 206 microns, $\Delta SG_{5-1}$ of 168; at $d_{50}$ of 170 microns, $\Delta SG_{5-1}$ of 147; at $d_{50}$ of 90 microns, $\Delta SG_{5-1}$ of 115. From FIG. 4, it is also possible to determine $d_{50}$ particle size from the determination of $\Delta SG_{5-1}$ on the molding powder. For example, at $\Delta SG_{5-1}$ of from 0 to 75 which encompasses Examples 3–27 herein, the $d_{50}$ particle size of the molding powders of the present invention is from about 30 to 70 microns.

EXAMPLES 29–34 — AGGLOMERATION

Molding powder of the present invention of finely ground beta polymer was agglomerated by stirring with tetrachloroethylene and water at 25°C. for about 15 minutes in a 2-liter glass resin kettle fitted with four ½ inch baffles and a stirrer set to operate a four-bladed 45° down-draft agitator at 2000 rpm. The solvent : PTFE ratio (ml solvent : g PTFE) is shown in the Table X and the PTFE : water weight ratio was about 1:10. One hundred grams of the ground beta resin was used in each experiment. The product, after separation and drying, had the following characteristics shown in the Table X. Properties of the finely ground beta resins used as the starting material are included under the heading control.

TABLE X

| | Agglomerated Samples | | | | | | |
|---|---|---|---|---|---|---|---|
| Example[1] | Control | 29 | 30 | 31 | 32 | 33 | 34 |
| Solvent/polymer | 0 | 0.2 | 0.24 | 0.27 | 0.3 | 0.33 | 0.4 |
| AD, calc g/l | 616 | 786 | 829 | 814 | 786 | 773 | 712 |
| SSS, microns | 5.1 | 16 | 17 | 32 | 35 | 36 | 19 |
| SSA, m²/g | 1.95 | 1.49 | 1.76 | 1.62 | 1.55 | 1.78 | 1.49 |
| SSG | 2.183 | 2.176 | 2.1765 | 2.176 | 2.176 | 2.176 | 2.176 |
| Porosity | 0.147 | 0.163 | 0.159 | 0.156 | 0.158 | 0.158 | 0.154 |
| (S) | −0.584 | −0.240 | −0.435 | −0.456 | −0.212 | −0.408 | −0.20 |
| Tensile strength, kg/cm² | — | — | 346 | 328 | 306 | — | — |
| $d_{50}$, microns (Av. agglomerate size) | — | 138 | 759 | 408 | 542 | 721 | 1075 |

[1]The $\Delta SG_{5-1}$ values for the control and each Example was about zero.

EXAMPLE 35 — AGGLOMERATION

Typical molding powder derived from fine powder A was agglomerated in the 45.7 cm stirred tank of Examples 21–23. The charge was 4.54 kg polymer, 38.14 kg water, and 1200 cc tetrachloroethylene. It was agitated at 860 rpm for 30 minutes at 25°C. The product, after separation and drying, had good sinterability and excellent AD and powder flow as shown by the following properties:

| Calc AD-g/l | 875 |
| --- | --- |
| Powder flow, g/sec | 31 |
| SSG | 2.217 |
| $\Delta SG_{5-1}$ | 30 |
| % S (5000) | 3.18 |
| $d_{50}$-microns (Av. agglom.size) | 590 |
| Tensile strength/elongation, kg/cm²/% | |
| 70 kg/cm² preform pressure | 167/227 |
| 141 kg/cm² preform pressure | 204/326 |
| 352 kg/cm² preform pressure | 245/453 |

EXAMPLE 36 — AGGLOMERATION

Using the same equipment as in Example 35, an experiment was conducted charging 682 kg of product made by partial decompaction of compacted Resin F, 381 kg water, and 3000 ml tetrachloroethylene. The mixture was stirred at 860 rpm for 30 minutes at 25°C., separated, and dried. Following are its properties:

| Calc AD-g/l | 830 |
| --- | --- |
| Powder flow g/sec | 28 |
| SSG | 2.175 |
| $\Delta SG_{5-1}$ | 40 |
| % S (5000) | 2.92 |
| $d_{50}$-microns (Av. agglom. size) | 225 |
| Tensile strength/elongation, kg/cm²/% | |
| 70.3 kg/cm² preform pressure | 198/292 |
| 140.6 kg/cm² preform pressure | 255/316 |
| 352 kg/cm² preform pressure | 280/374 |

What is claimed is:
1. Polytetrafluoroethylene molding powder having
   a. a specific surface area of at least 1.5 m²/g,
   b. an average particle diameter of less than 100 microns;
   c. an apparent density of at least 500 g/l, with the proviso that the apparent density is at least as great as the value calculated from the equation

$$\text{apparent density} = 500 \text{ g/l} + 3.00 \ (\Delta SG_{5-1})$$

wherein $\Delta SG_{5-1}$ is 1000 times the difference in specific gravities of sintered moldings made at preform pressures of 1000 psi and 5000 psi wherein said $\Delta SG_{5-1}$ is no greater than 75,
   d. a tensile strength of at least 245 kg/cm² at 70 kg/cm² preform pressure,
   e. a porosity of less than 0.20, and
   f. a $\Delta SG_{5-1}$ no greater than 75.
2. The polytetrafluoroethylene molding powder of claim 1 wherein $\Delta SG_{5-1}$ is zero.
3. The polytetrafluoroethylene molding powder of claim 1 wherein $\Delta SG_{5-1}$ is no greater than 30.
4. The polytetrafluoroethylene molding powder of claim 3 wherein the apparent density is at least 600 g/l.
5. The polytetrafluoroethylene molding powder of claim 1 wherein said apparent density is at least 600 g/l.
6. The polytetrafluoroethylene molding powder of claim 5 wherein said apparent density is at least as great as the value calculated from equation $$\text{Apparent density} \geq 600 \text{ g/l} + 3.00 \ (\Delta SG_{5-1})$$

7. The polytetrafluoroethylene molding powder of claim 1 having a porosity of no greater than 0.20 and an (S) absolute value of less than 0.80.
8. The polytetrafluoroethylene molding powder of claim 1 having a % S (1000) of less than 8.0.
9. The polytetrafluoroethylene molding powder of claim 1 wherein the individual particles thereof exhibit birefringence when viewed microsopically with polarized light.
10. The polytetrafluoroethylene molding powder of claim 1 in the form of free-flowing agglomerates having an average agglomerate diameter of from 300 to 1000 microns.
11. The polytetrafluoroethylene molding powder of claim 1 having an average particle diameter of at least 10 microns.
12. The polytetrafluoroethylene molding powder of claim 11 having $\Delta SG_{5-1}$ of less than 15.
13. The polytetrafluoroethylene molding powder of claim 12 having an average particle diameter of 10 to 20 microns.

* * * * *